(12) United States Patent
Miao

(10) Patent No.: US 7,860,407 B2
(45) Date of Patent: Dec. 28, 2010

(54) PRE-EMPHASIS CIRCUIT

(75) Inventor: Jason Y. Miao, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 713 days.

(21) Appl. No.: 11/830,648

(22) Filed: Jul. 30, 2007

(65) Prior Publication Data

US 2009/0033426 A1     Feb. 5, 2009

(51) Int. Cl.
*H04B 10/06*     (2006.01)
*H04B 10/00*     (2006.01)

(52) U.S. Cl. .................. 398/208; 398/135; 398/136; 398/202

(58) Field of Classification Search .......... 398/135–138, 398/202, 208, 209, 210, 211
See application file for complete search history.

(56) References Cited

U.S. PATENT DOCUMENTS

2004/0131058 A1*   7/2004   Ghiasi ..................... 370/389

* cited by examiner

*Primary Examiner*—Ken N Vanderpuye
*Assistant Examiner*—Daniel G Dobson
(74) *Attorney, Agent, or Firm*—Workman Nydegger

(57) ABSTRACT

An amplifier stage or circuit for providing pre-emphasis. The circuit includes a first input node configured to receive a first data signal and a second input node configured to receive a second data. The circuit also includes an adjustable delay stage configured to at least partially produce a delay in the first and/or second data signals to thereby generate a first delayed signal and/or second delayed signal. The circuit additionally includes a pulse generation stage configured to generate a first pulse signal from the first delayed signal and the first data signal and/or produce a second pulse signal from the second delayed signal and the second data signal. The circuit further includes a first output node configured to output the first pulse signal and a second output node configured to output the second pulse signal.

19 Claims, 6 Drawing Sheets

PRE-EMPHASIS CIRCUIT

CROSS-REFERENCE TO RELATED APPLICATIONS

Not applicable.

BACKGROUND

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to as the "controller") controls the operation of the laser driver and post-amplifier.

Often, signals propagating through the post-amplifier are subject to attenuation and other signal weakening distortions caused by the various components of the post-amplifier. In such cases, the signal that is output from the post-amplifier may not be of a sufficient strength for further signal processing by a host computing system. Accordingly, it would be advantageous to provide a boost or pre-emphasis to the signal output from the post-amplifier in order to compensate for any attenuation or other signal weakening distortion.

BRIEF SUMMARY

Embodiments disclosed herein relate to an amplifier stage or circuit for providing pre-emphasis. Alternative embodiments relate to post-amplifiers and optical transceivers that include an amplifier stage or circuit for providing pre-emphasis. The circuit may include a first input node configured to receive a first data signal and a second input node configured to receive a second data signal that is complementary of the first data signal.

The circuit also includes an adjustable delay stage having a first node coupled to the first input node and a second node coupled to the second input node. The adjustable delay stage is configured to at least partially produce a delay in the first and/or second data signals to thereby generate a first delayed signal and/or second delayed signal.

The circuit also includes a pulse generation stage having a first node coupled to a third node of the adjustable delay stage and a second node coupled to a fourth node of the adjustable delay stage and having a third node coupled to the first input node and a fourth node coupled to the second input node. The pulse generation stage is configured to generate a first pulse signal from the first delayed signal and the first data signal and/or produce a second pulse signal from the second delayed signal and the second data signal.

The circuit further includes a first output node coupled to a fifth node of the pulse generation stage configured to output the first pulse signal and a second output node coupled to a sixth node of the pulse generation stage configured to output the second pulse signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein relate to an amplifier stage or circuit for providing pre-emphasis. Alternative embodiments relate to post-amplifiers and optical transceivers that include an amplifier stage or circuit for providing pre-emphasis. The circuit may include a first input node configured to receive a first data signal and a second input node configured to receive a second data signal that is complementary of the first data signal.

The circuit also includes an adjustable delay stage having a first node coupled to the first input node and a second node coupled to the second input node. The adjustable delay stage is configured to at least partially produce a delay in the first and/or second data signals to thereby generate a first delayed signal and/or second delayed signal.

The circuit also includes a pulse generation stage having a first node coupled to a third node of the adjustable delay stage and a second node coupled to a fourth node of the adjustable delay stage and having a third node coupled to the first input node and a fourth node coupled to the second input node. The pulse generation stage is configured to generate a first pulse signal from the first delayed signal and the first data signal and/or produce a second pulse signal from the second delayed signal and the second data signal.

The circuit further includes a first output node coupled to a fifth node of the pulse generation stage configured to output the first pulse signal and a second output node coupled to a sixth node of the pulse generation stage configured to output the second pulse signal.

I. Operating Environment

Figure 1:
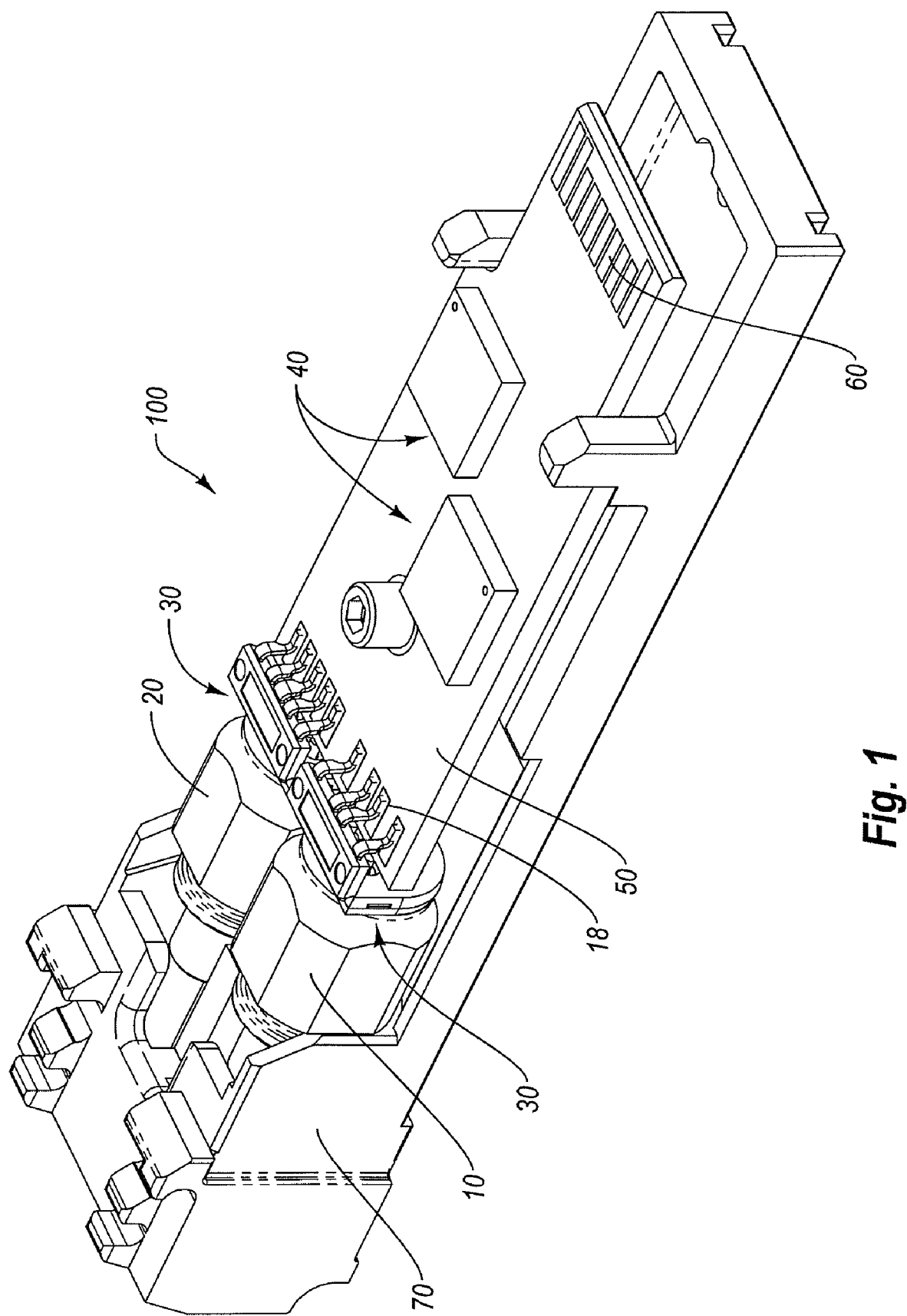
FIG. 1 is a perspective view of an example of an optical transceiver module.

Reference is first made to FIG. 1, which depicts a perspective view of an example optical transceiver module ("transceiver"), generally designated at 100, for use in transmitting and receiving optical signals in connection with an external host that is operatively connected, in one embodiment, to a communications network. As shown, the transceiver shown in FIG. 1 includes various components, including a Receiver Optical Subassembly ("ROSA") 10, a Transmitter Optical Subassembly ("TOSA") 20, electrical interfaces 30, various electronic components 40, such as a laser-driver/post-amplifier and a control module for example, and a printed circuit board 50 which supports the electronic components 40.

In the illustrated embodiment, two electrical interfaces 30 are included in the transceiver 100, one each used to electrically connect the ROSA 10 and the TOSA 20 to a plurality of conductive pads located on the PCB 50. The electronic components 40 are also attached to the PCB 50. An edge connector 60 is located on an end of the PCB 50 to enable the transceiver 100 to electrically and mechanically interface with a host (not shown). In addition, the above-mentioned components of the transceiver 100 are partially housed within a housing 70. Though not shown, some embodiments include a shell that cooperates with the housing 70 to define an enclosure for components of the transceiver 100.

Figure 2:
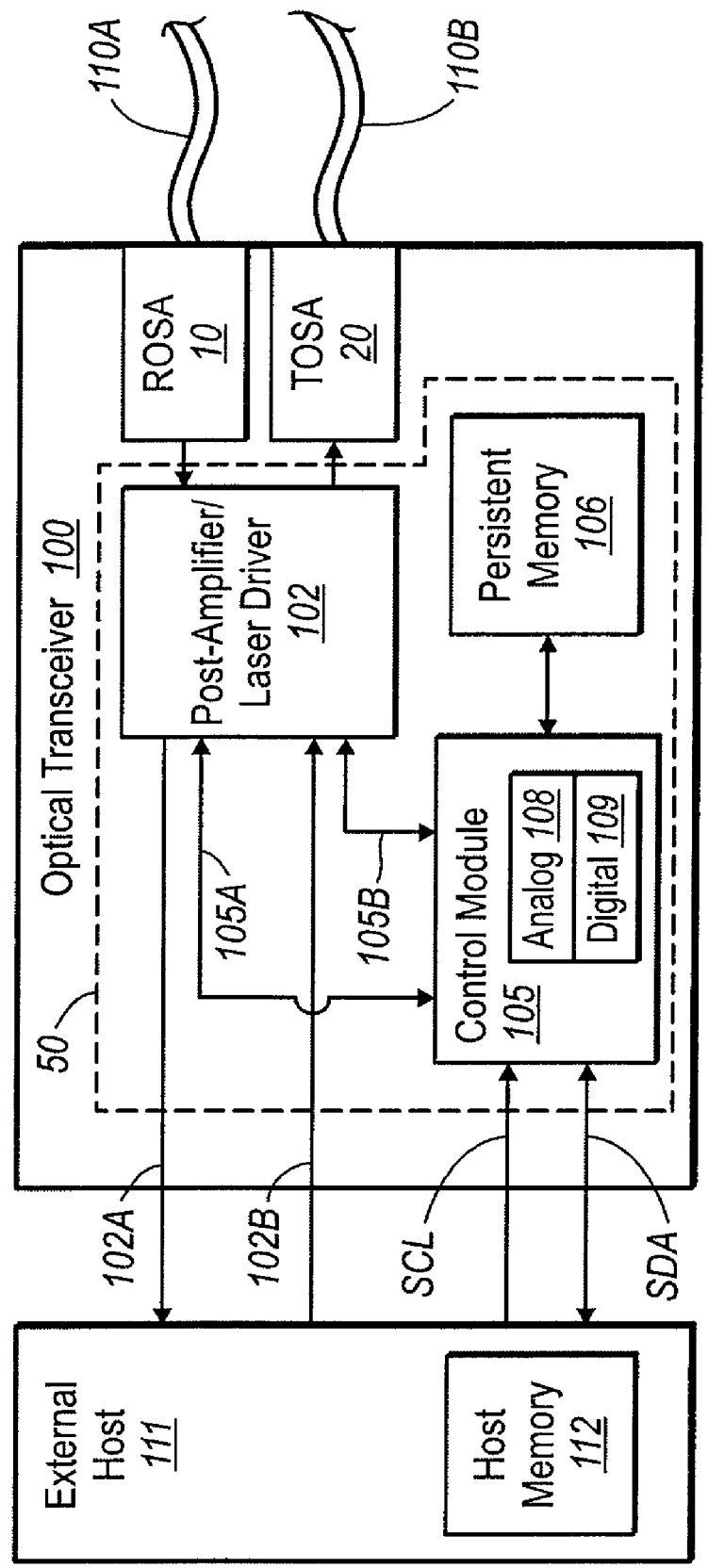
FIG. 2 is a simplified block view showing various aspects of the optical transceiver module of FIG. 1.

Reference is now made to FIG. 2, which is a simplified block diagram of an example of an optical transceiver, denoted at 100 in FIG. 1, depicting various physical and operational aspects of the transceiver. While the optical transceiver 100 will be described in some detail, the optical transceiver 100 is described by way of illustration only, and not by way of restricting the scope of the invention. As mentioned above, the optical transceiver 100 in one embodiment is suitable for optical signal transmission and reception at a variety of per-second data rates, including 1 Gbit/s, 2 Gbit/s, 4 Gbit/s, 8 Gbit/s 10 Gbit/s, as well as even higher data rates. Furthermore, the embodiments described herein can be implemented in optical transceivers conforming with any of a variety of different form factors, examples of which include, but are not limited to, XFP, SFP, SFP+ and SFF, as well as a variety of different communication protocols, examples of which include, but are not limited to, GiGE, SONET, and Fibre Channel.

With continuing reference to FIG. 2, and with reference as well to FIG. 1, transceiver 100 includes printed circuit board ("PCB") 50 on which the various electronic components of the transceiver are mounted. One such component is a control module 105. Control module 105 is connected to an integrated post-amplifier/laser driver ("PA/LD") 102 by connections 105A and 105B. These connections allow control module 105 to monitor the operation of the post-amplifier/laser driver 102 as will be described in more detail to follow. Control module 105 is connected to a persistent memory 106, which stores microcode for configuring control module 105 and is also used to store operational parameters. The control module 105 is also able to communicate with an external host 111 as depicted by the Serial Data line (SDA) and Serial Clock line (SCL).

Transceiver 100 includes both a transmit path and a receive path, both of which will now be described. The receive path includes ROSA 10, which transforms an incoming optical data signal into an electrical data signal. The electrical data signal is then provided to a post-amplifier portion of PA/LD 102. The post-amplifier amplifies and otherwise processes the electrical data signal and provides the electrical data signal to the external host 111 via connection 102A.

For the transmit path, external host 111 generates an electrical data signal and provides the electrical data signal to a laser driver portion of PA/LD 102 via connection 102B. The laser driver processes the electrical data signal and drives the TOSA 20, which causes the TOSA 20 to emit an optical data signal.

The operation of transceiver 100 will now be described in further detail. In operation, the optical transceiver 100, receives an optical data signal from a fiber 110A via the ROSA 10 in manner to be described more fully below. The ROSA 10 transforms the received optical data signal into an electrical data signal. The ROSA 10 then provides the resulting electrical data signal to a post-amplifier. In the illustrated embodiment, the post amplifier is consolidated with the laser driver as an integrated PA/LD 102. As such, the PA/LD 102 resides on a single integrated circuit chip and is included as a component, together with the other electronic components 40, some of which are further described below, on PCB 50. In other embodiments, the post amplifier and laser driver are implemented as separate components on the PCB 50.

The post-amplifier portion of the PA/LD 102 amplifies the received electrical data signal and provides the amplified data signal to external host 111 over signal path 102A. The external host 111 may be any computing system capable of communicating with the optical transceiver 100. The external host 111 contains a host memory 112 that may be any volatile or non-volatile memory source. In one embodiment, some components of the optical transceiver 100 can reside on the host 111 while the other components of the transceiver reside on the PCB 50 separate from the host 111.

The optical transceiver 100 may also receive electrical data signals from the host 111 for transmission onto a fiber 110B. Specifically, the laser driver portion of the PA/LD 102 receives the electrical data signal from the host 111 via the signal path 102B, and drives a light source within the TOSA 20. One example of a light source is a DML that causes the TOSA 20 to emit onto the fiber 110B optical data signals representative of the information in the electrical data signal provided by the host 111.

The behavior of the ROSA 10, the PA/LD 102, and the TOSA 20 may vary dynamically due to a number of factors.

For example, temperature changes, power fluctuations, and feedback conditions may each affect the performance of these components. Accordingly, the transceiver 100 includes a control module 105, which may evaluate environmental conditions, such as temperature, age of the laser, and/or operating conditions, such as voltage, and receive information from the post-amplifier portion of the PA/LD 102 by way of connection 105A, and from the laser driver portion of the PA/LD by way of connection 105B. This arrangement allows the control module 105 to optimize the performance of the laser to compensate for dynamically varying conditions.

Specifically, the control module 105 optimizes the operation of the transceiver 100 by adjusting settings on the PA/LD 102 as represented by the connections 105A and 105B. These settings adjustments can be intermittent and are generally only made when temperature or voltage or other low frequency changes so warrant.

The control module 105 has access to a persistent memory 106, which in one embodiment, is an Electrically Erasable and Programmable Read Only Memory (EEPROM). Persistent memory 106 may also be any other non-volatile memory source. Persistent memory 106 is used to store microcode for configuring control module 105 and for storing operational parameters that have been measured by the control module 105. The persistent memory 106 and the control module 105 may be packaged together in the same package or in different packages without restriction.

Data and clock signals may be provided from the host 111 to the control module 105 using the SDA and SCL lines respectively. Also data may be provided from the control module 105 to the host 111 to allow for transmitting diagnostic data such as environmental and/or operational parameters. The control module 105 includes both an analog portion 108 and a digital portion 109. In this example, the analog portion 108 and the digital portion 109 collectively enable the control module to implement logic digitally, while still largely interfacing with the rest of the optical transceiver 100 using analog signals.

II. Example Embodiment of a Post-Amplifier

Figure 3:
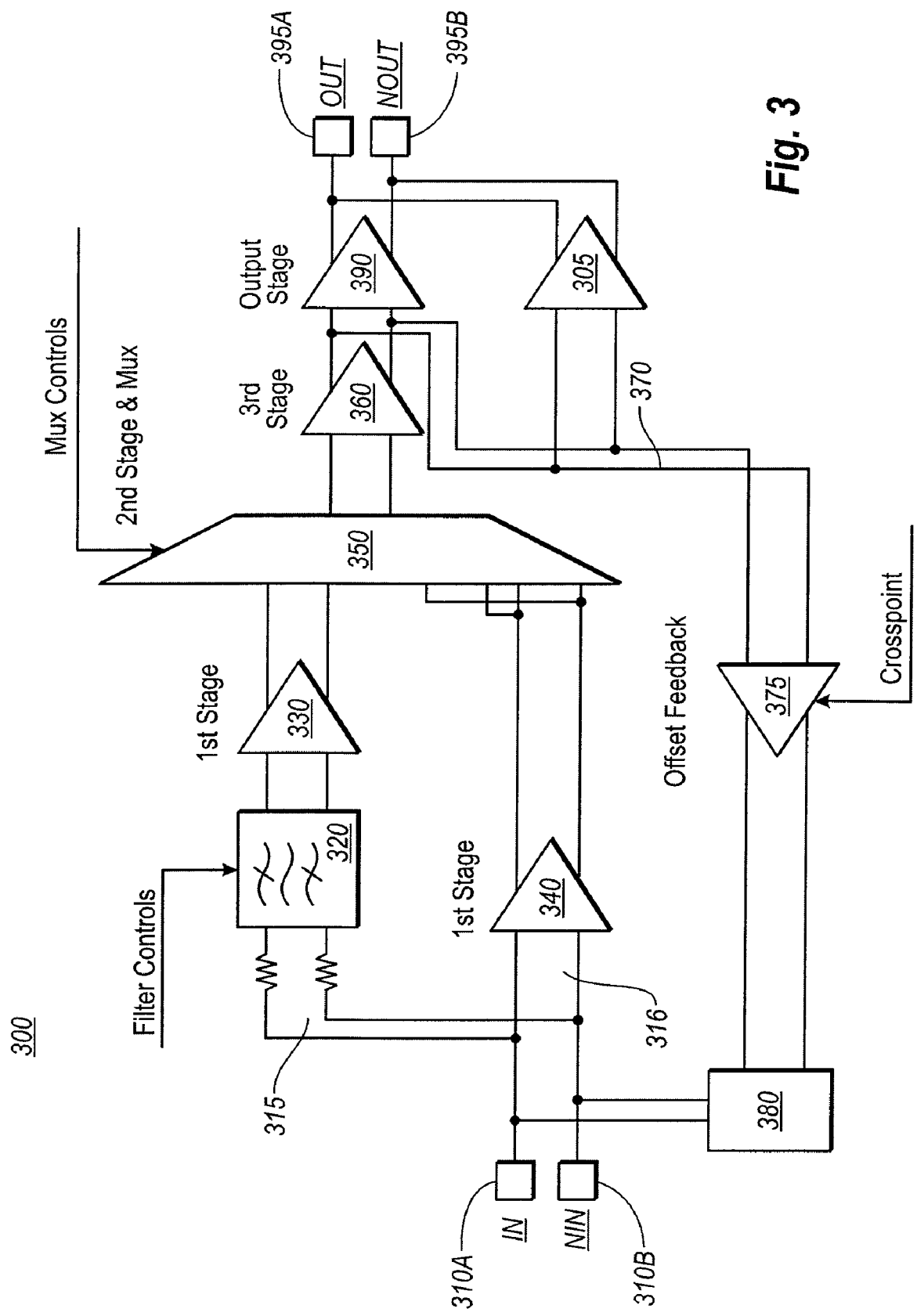
FIG. 3 is a block diagram of an example post-amplifier module of the transceiver of FIG. 2.

Referring now to FIG. 3, a block diagram of an example post-amplifier 300 is shown. The post amplifier 300 may correspond to the post amplifier portion of LD/PA 102 of FIGS. 1 and 2, although this is not required. Note that the following description is for illustration only and should not be used to limit the scope of the appended claims or the embodiments disclosed herein.

Post-amplifier 300 includes a differential input 310A and 310B. The differential input may receive a differential signal from a receiver stage such as ROSA 10 of FIGS. 1 and 2. Specifically, input node 310A receives the positive signal portion and input node 310B receives a complimentary signal portion. As mentioned above, the differential signal received at nodes 310A and 310B may be 1 Gbit/s, 2 Gbit/s, 4 Gbit/s, 10 Gbit/s, as well as even higher data rates. Note that although FIG. 3 and its accompanying description depict the received signal as being differential, the embodiments disclosed herein also apply to a singled ended system.

Post-amplifier 300 further includes a low speed path 315 and a high speed path 316. 1 Gbit/s, 2 Gbit/s, 4 Gbit/s signals are propagated on the low speed path 315 to a filter 320. Filter 320 performs rate selection on the signal. For example, control signals are received that indicate whether a 1 Gbit/s, 2 Gbit/s, or 4 Gbit/s signal should be passed. Any non-selected signals are filtered out.

The filter 320 then provides the selected signal to a low speed path first gain stage 330. The first gain stage 330, which may be comprised of any reasonable components, amplifies the signal. In one embodiment, gain stage 330 is configured to provide 30 dB of gain to the signal.

In like manner, any 10 Gbit/s or higher signals are propagated on the high speed path 316 to a high speed path first gain stage 340, where the signal is amplified. In one embodiment, the gain stage 340, which may also be comprised of any reasonable components, is configured to provide a gain equivalent to the amount provided by gain stage 330.

A second gain stage and multiplexer 350 is then used to select a desired signal and to add additional gain to the signal. For example, second gain stage and multiplexer 350 receives control signals that specify whether to select a signal from low speed path 315 or from high speed path 316. The selected signal is then amplified by second gain stage and multiplexer 350. In one embodiment, second gain stage and multiplexer 350, which may be comprised of any reasonable components, is configured to provide 14 dB of gain to the signal.

Post-amplifier 300 further includes a third gain stage 360. As with the gain stages previously discussed, third gain stage 360 may be implemented with any reasonable components. The third gain stage 360 receives the signal from second gain stage 350 and amplifies the signal. In some embodiments, third gain stage is configured to provide 3 dB of gain to the signal.

The signal is then passed to output stage 390. The differential signal is then provided to output nodes 395A and 395B, where it may be propagated to other components of the optical transceiver 100.

In some embodiments, post-amplifier 300 may include a feedback loop 370. In such embodiments, the signal output from the third gain stage 360 is propagated through the feedback loop 370. The signal passes through gain stage 375, which may be comprised of any reasonable components, where amplification takes place. In some embodiments, cross-point adjustment may occur in gain stage 375. The signal also passes through an offset cancel module 380 that is configured to provide offset cancellation.

In other embodiments, post-amplifier 300 may also include a pre-emphasis stage 305, which may be implemented with any reasonable components. In such embodiments, the signal output from the first third stage 360 is propagated to pre-emphasis stage 305, where amplification takes place. The signal output from pre-emphasis stage 305 is then added to the signal output from output stage 390 to provide pre-emphasis to the signal output at nodes 395A and 395B.

Having described an exemplary environment with respect to FIGS. 1, 2 and 3, it will be understood that such environment is only one of countless architectures in which the embodiments described herein may be employed. As previously stated, the embodiments described herein are not intended to be limited to implementation in any particular environment.

III. Example Embodiments of a Pre-Emphasis Circuit

Figure 4:
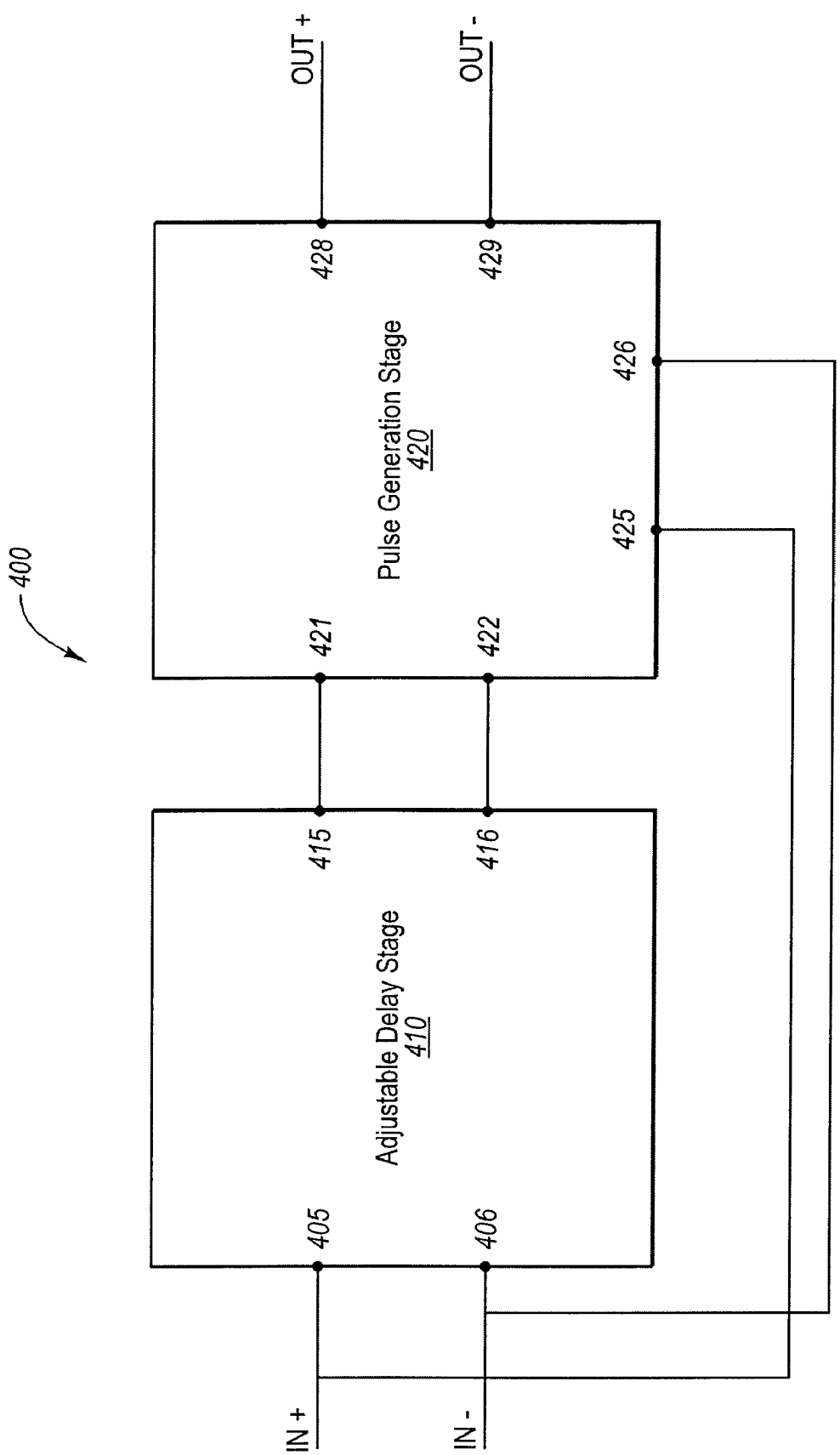
FIG. 4 is a block diagram of a pre-emphasis circuit.

FIG. 4 illustrates an example pre-emphasis circuit or stage 400 in accordance with the principles of the present invention. Pre-emphasis circuit 400 may correspond to pre-emphasis stage 305 although this is not required. Note that although various components are illustrated as comprising circuit 400, it should be understood that this is for illustration only. The embodiments disclosed herein contemplate a circuit 400 with additional components not illustrated in FIG. 4. Also note that the reference to a first, second, third, etc. component (such as a transistor) in this description and in the claims is not intended to imply any sequential listing and is merely intended to distinguish one component from another.

Pre-emphasis circuit 400 may include an adjustable delay stage 410 that may be coupled to another stage of post-amplifier 300. For example, as illustrated in FIG. 3, adjustable delay stage 410 may be coupled to the output of second stage 350 and the input of third stage 360. Of course other configurations are also contemplated by the embodiments disclosed herein.

As illustrated, adjustable delay stage 410 includes a first input node 405 for receiving a first data signal and an input node 406 that is configured to receive a second data signal that is complementary to the first data signal. Note that in some embodiments, programmable first stage 410 may receive a single ended signal.

In operation, adjustable delay stage 410 is configured to create a delay in the first data signal and/or the second data signal before providing those signals to the other components of circuit 400. In other words, adjustable delay stage 410 is configured to create a delayed version of the received first and/or second data signal.

Advantageously, adjustable delay stage 410 is further configured with means to adjust the delay created in the signal. This allows a user to increase or decrease the signal delay as needed. In some embodiments, the adjustment of the delay may be performed manually by the user. In other embodiments, circuit 400 may include or have access to one or more registers that include programmable instructions that direct adjustable delay stage 410 to adjust the delay as needed. In still other embodiments, adjustable delay stage 410 may be programmed by a control signal 440 received from control module 105 or some other source that directs adjustable delay stage 410 to adjust the signal delay a desired amount. Note that adjustable delay stage 410 may be configured to receive the control signal 440 or the instructions from register(s) by any reasonable electrical interface.

Adjustable delay stage 410 further includes an output node 415 for providing the delayed first data signal to an input node 421 of a pulse generation stage 420. In addition, an output node 416 of adjustable delay stage 410 provides the delayed complimentary data signal to an input node 422 of pulse generation stage 420. Note that in some embodiments, second stage 420 may receive a single ended signal from a adjustable delay stage 410. As illustrated, pulse generation stage 420 also includes an input node 425 for receiving the first data signal and an input node 426 for receiving the second data signal. As shown, the signals received at input nodes 425 and 426 are the same as the signal received at input nodes 405 and 406 of adjustable delay stage 410 and do not include any delay.

In operation, pulse generation stage 420 receives the delayed first data signal and the delayed second data signal from the adjustable delay stage 410 and receives the non-delayed first data signal and second signal. Pulse generation stage 420 is configured generate a pulse that may be summed with the signal at the output of post-amplifier 300. Specifically, pulse generation stage 420 utilizes the received delayed and non-delayed signals to create the pulse. The generated pulse is then supplied via output nodes 428 and 429 to the output of post-amplifier 300. Accordingly, pre-emphasis is provided at the output of post-amplifier 300 to compensate for any signal attenuation or other signal degradation in the post-amplifier as will be explained in more detail to follow.

Advantageously, pulse generation stage 420 may be further configured with means to adjust the generated pulse signals. This allows a user to adjust the amplitude or speed of the pulses as needed. For example, a pulse signal with a larger amplitude may create Electro-Magnetic Interference (EMI) issues at the output of post-amplifier 300. In such cases, it may be desirable to lower the amplitude of the generated pulse. As above, a user may adjust the amplitude of pulse manually. In other embodiments, pulse generation stage 420 may have access to registers that include programmable instructions that direct pulse generation stage 420 to adjust the pulse as needed. In still other embodiments, pulse generation stage 420 may be programmed by the control signal 440 received from control module 105 or some other source that directs pulse generation stage 420 to adjust the pulse a desired amount. Note that pulse generation stage 420 may be configured to receive the control signal 440 or the instructions from register(s) by any reasonable electrical interface.

Figure 5:
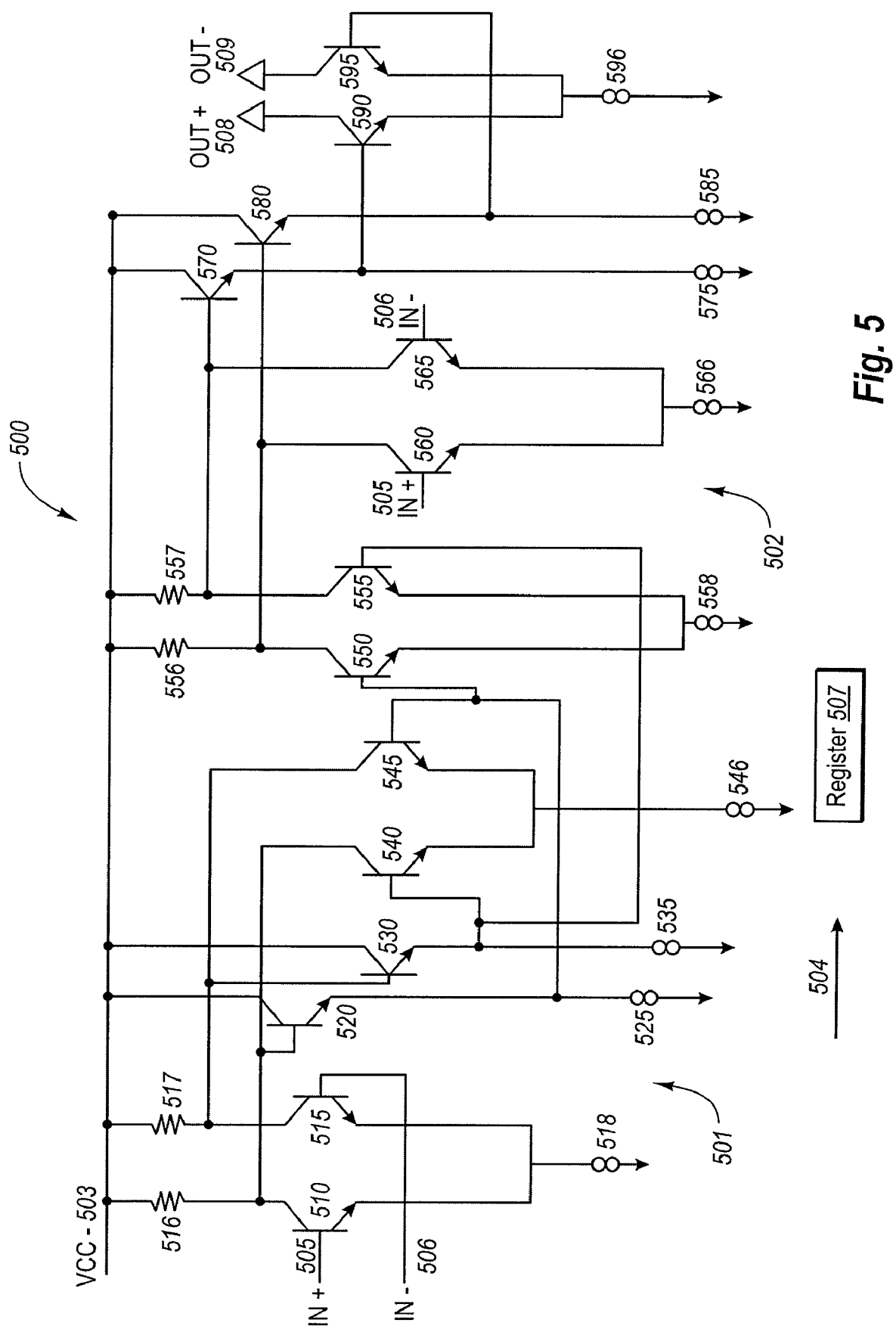
FIG. 5 is a specific embodiment of the pre-emphasis circuit of FIG. 4.

Referring now to FIG. 5, a specific embodiment of a pre-emphasis circuit or stage 500 is illustrated. Note that although various components are illustrated as comprising circuit 500, it should be understood that this is for illustration only. The embodiments disclosed herein contemplate a circuit 500 with additional components not illustrated in FIG. 5. As illustrated, pre-emphasis circuit 500 includes a delay stage 501 that may correspond to delay stage 410, although this is not required, and a pulse generation stage 502 that may correspond to pulse generation stage 420, although this is also not required.

The delay stage 501 includes an input node 505 for receiving a first data signal and an input node 506 that is configured to receive a second data signal that is complementary to the first data signal. The input nodes 505 and 506 may be coupled to another component of post-amplifier as explained previously.

The first data signal is provided to a first bipolar transistor 510. Specifically, a base terminal of transistor 510 is coupled to the input node 505. A collector terminal of bipolar transistor 510 is coupled to a first terminal of a first resistor 516 while a second terminal of first resistor 516 is configured to be coupled to a voltage source VCC 503. An emitter of bipolar transistor 510 is coupled to an adjustable or programmable current source 518.

Note that adjustable or programmable current source 518, along with all of the other adjustable or programmable current supplies to be discussed, may be configured to receive a control signal 501 from control module 105 or some other processing source that specifies how much signal delay adjustment and/or pulse amplitude adjustment is needed by any reasonable electrical interface. Alternatively, instructions may be provided to one or registers 507 that direct the adjustment of the delay signals or pulse signals as previously described.

The second data signal is provided to a second bipolar transistor 515. Specifically, a base terminal of bipolar transistor 515 is coupled to the input node 506. A collector terminal of bipolar transistor 515 is coupled to a first terminal of a second resistor 517, while a second terminal of second resistor 517 is configured to be coupled to the voltage source VCC 503. An emitter of bipolar transistor 515 is coupled to the emitter terminal of bipolar transistor 510 and to adjustable current source 518. As illustrated in FIG. 5, transistors 510 and 515 form a bipolar transistor differential pair.

The programmable current supplies are further configured to receive a control signal 525 from control module 105 or some other processing source that specifies how much current adjustment is needed by any reasonable electrical interface.

The first data signal is provided to a third bipolar transistor 520. Specifically, a base terminal of third bipolar transistor 520 is coupled to the collector terminal of first bipolar transistor 510 and the first terminal of first resistor 516. A collector terminal to third bipolar transistor 520 is configured to be coupled to VCC 503, while an emitter terminal of third bipolar transistor 520 is coupled to a current source 525.

In like manner, the second data signal is provided to a fourth bipolar transistor 530. Specifically, a base terminal of fourth bipolar transistor 530 is coupled to the collector terminal of second bipolar transistor 515 and the first terminal of second resistor 517. A collector terminal of fourth bipolar transistor 530 is configured to be coupled to VCC 503, while an emitter terminal of fourth bipolar transistor 530 is coupled to a current source 535.

The first data signal is also provided to a fifth bipolar transistor 540. As shown, a collector terminal of bipolar transistor 540 is coupled to the node including the collector terminal of the first bipolar transistor 510, the first terminal of first resistor 516, and the base terminal of bipolar transistor 520. The base terminal of fifth bipolar transistor 540 is coupled to the emitter terminal of fourth bipolar transistor 530, while an emitter terminal of fifth bipolar transistor 540 is coupled to an adjustable or programmable current source 546.

Similarly, the second data signal is provided to a sixth bipolar transistor 545. As shown, a collector terminal of bipolar transistor 545 is coupled to the node including the collector terminal of the second bipolar transistor 515, the first terminal of second resistor 517, and the base terminal of bipolar transistor 530. The base terminal of sixth bipolar transistor 545 is coupled to the emitter terminal of third bipolar transistor 520, while an emitter terminal of sixth bipolar transistor 545 is coupled to the adjustable or programmable current source 546 and the emitter terminal of fifth bipolar transistor 540. As illustrated, bipolar transistors 540 and 545 form a transistor differential pair.

As mentioned previously, circuit 500 also includes a second stage 502. Second stage 502 includes a seventh bipolar transistor 550 having a base terminal coupled to the base terminal of bipolar transistor 545 and the emitter terminal of bipolar transistor 520, via which a delayed signal is received. A collector terminal of seventh bipolar transistor 550 is coupled to a first terminal of a third resistor 556, which has a second terminal that is configured to be coupled to VCC 503. An emitter terminal of transistor 550 is coupled to a current source 558.

An eighth bipolar transistor 555 has a base terminal coupled to the base terminal of bipolar transistor 540 and the emitter of bipolar transistor 530, via which a delayed signal is received. A collector terminal of eighth bipolar transistor 555 is coupled to a first terminal of a fourth resistor 557, which has a second terminal configured to be coupled to VCC 503. An emitter terminal of eighth bipolar transistor 555 is coupled to current source 558 and to the emitter terminal of bipolar transistor 550. Bipolar transistors 550 and 555 form a transistor differential pair.

A ninth bipolar transistor 560 has a base terminal coupled to first input node 505 and receives the first signal from this node. A collector terminal of ninth bipolar transistor 560 is coupled to the collector of bipolar transistor 550 and the first terminal of resistor 556. The emitter terminal of ninth bipolar transistor 560 is coupled to a current source 566.

A tenth bipolar transistor 565 has a base terminal coupled to the second input node 506 and receives the second signal from this node. A collector terminal of tenth bipolar transistor 565 is coupled to the collector of bipolar transistor 555 and the first terminal of resistor 557. The emitter terminal of tenth bipolar transistor 565 is coupled to the current source 566 and the emitter terminal of bipolar transistor 566. Bipolar transistors 560 and 565 also form a transistor differential pair.

As illustrated, an eleventh bipolar transistor 570 and a twelfth bipolar transistor 580 are also provided in second stage 502. As shown, eleventh bipolar transistor 570 has a base terminal that is coupled to the collector terminal of bipolar transistor 565, the first terminal of resistor 557 and the collector of bipolar transistor 555. The collector terminal of eleventh bipolar transistor 570 is configured to be coupled to VCC 503 when in operation while the emitter terminal of eleventh bipolar transistor 570 is coupled to an adjustable or programmable current source 575.

Twelfth bipolar transistor 580 has a base terminal that is coupled to the collector terminal of bipolar transistor 560, the first terminal of resistor 556 and the collector of bipolar transistor 550. The collector terminal of twelfth bipolar transistor 580 is configured to be coupled to VCC 503 when in operation while the emitter terminal of twelfth bipolar transistor 580 is coupled to an adjustable or programmable current source 585.

Thirteenth and fourteenth bipolar transistors 590 and 595 are additionally included in second stage 502 and function as an output stage for pre-emphasis circuit 500. As illustrated, a base terminal of bipolar transistor 590 is coupled to the emitter terminal of bipolar transistor 570. An emitter terminal of bipolar transistor 590 is coupled to a current source 596 while the collector terminal of bipolar transistor 590 is coupled to a first output node 508.

A base terminal of bipolar transistor 595 is coupled to the emitter terminal of bipolar transistor 580. An emitter terminal of bipolar transistor 595 is coupled to the current source 596 and the emitter terminal of bipolar transistor 590, while the collector terminal of bipolar transistor 595 is coupled to a second output node 509. In operation first output node 508 is configured to provide a first output signal and second output node 509 is configured to provide a second output signal that is complimentary to the first output signal to one or more other output signals of a post-amplifier 300 as previously described. As explained, first and second output signals provided at nodes 508 and 509 are added to the one or more additional signals to at least partially provide pre-emphasis to the signal output from post-amplifier 300.

Figure 6:
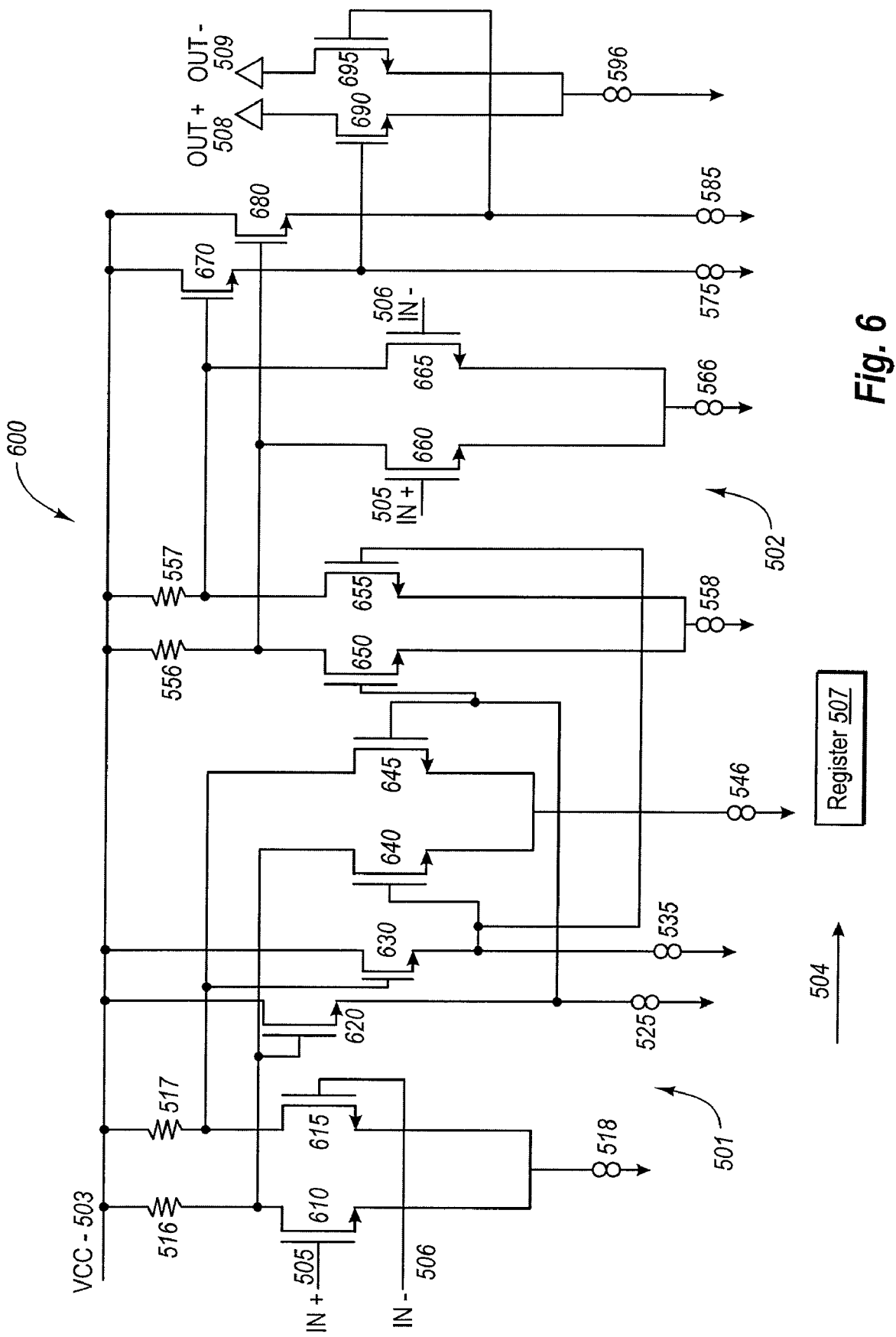
FIG. 6 is an alternative embodiment of the pre-emphasis circuit of FIG. 4.

FIG. 6 illustrates an alternative embodiment 600 of a pre-emphasis circuit. As illustrated, pre-emphasis circuit 600 includes a delay stage 601 and a pulse generation stage 602. As further illustrated, pre-emphasis circuit 600 implements Field Effect Transistors (FET) instead of the bipolar transistors of pre-emphasis circuit 500. In general, circuit 600 may be created from circuit 500 by replacing the base terminals with gate terminals, the emitter terminals with source terminals, and the collector terminals with drain terminals. Accordingly, pre-emphasis circuit 600 operates similarly to pre-emphasis circuit 500 and need not be further explained.

IV. Operation of a Pre-Emphasis Circuit

As mentioned previously, signals propagating through post-amplifier 300 are often subject to attention or other signal weakening distortions. Advantageously, the principles of the present invention provide for an amplifier stage or circuit that provides a pre-emphasis or signal boost to the signal output from the post amplifier. This at least partially overcomes the signal attenuation.

In operation, a differential signal is provided to nodes 505 and 506 from another stage of post-amplifier 300, such as third stage 360. This signal is then processed by the various transistors and other components of adjustable delay stage 501 or 601 to create a delay in the differential signal. The delayed signals may then be provided to pulse generation stage 502 or 602 via transistors 540/640 and 545/645.

As mentioned, the signal delay produced by the various transistors and other components of adjustable delay stage 501 or 601 may be adjusted as needed by adjusting adjustable or programmable current supplies 518 and/or 546. For example, increasing the current delivered by current source 546 to transistors 540/640 and 545/645 has the effect of making the resistance of resistors 516 and 517 appear larger, which in turn increases the RC time constant of the signal. As a result, the signal delay will be increased. On the other hand, increasing the current delivered by current source 518 to transistors 510/610 and 515/615 has the effect of making the resistance of resistors 516 and 517 appear smaller, which in turn decreases the RC time constant of the signal. As a result, the signal delay will be decreased.

Accordingly, the amount of current provided by adjustable or programmable current sources 518 and 546 may be increased or decreased as needed to produce a desired signal delay. As mentioned previously, a control signal 504 from control module 105 or some other source may direct the adjustable or programmable current supplies 518 and/or 546 to adjust the amount of current they provide as needed. Alternatively, instructions directing the adjustable or programmable current sources 518 and 546 may be written to register(s) 507 and then provided to the adjustable or programmable current sources.

As mentioned, the delayed differential signal is then provided to pulse generation stage 502 or 602. In addition, the non-delayed differential signal is also provided to pulse generation stage 502 or 602. Both the delayed and non-delayed signals are then processed by the various transistors and other components of pulse generation stage 502 or 602 to generate a pulse. For example, as is well known in the art, subtracting a delayed version of a signal from a non-delayed version of the signal will generate a pulse signal. Accordingly, the various transistors and other components of pulse generation stage 502 or 602 subtract the delayed differential signal from the non-delayed differential signal to generate the pulse signal.

The differential pulse signal may then be provided at output nodes 508 and 509, where the pulse signal may be summed with the signal produced by output stage 390. Advantageously, the summed pulse provides pre-emphasis or a signal boost that at least partially compensates for signal attenuation or the like in post-amplifier 300.

As mentioned, in some embodiments it may be desirable to control the amplitude and/or speed of the generated pulse that is provided at nodes 508 and 509. Advantageously, the principles of the present invention provide for the adjustment of adjustable or programmable current supplies 575 and 585. For example, a control signal 504 or instructions in register(s) 507 may direct current source 575 to adjust the amount of current in transistor 570/670 and/or may direct current source 585 to adjust the amount the current in transistor 580/680. Adjusting the current in the emitter-follower buffer of transistor 570/670 and transistor 580/680 allows for the adjustment of the amplitude and/or speed of the generated pulse to a desired level.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A circuit for providing pre-emphasis comprising:
a first input node configured to receive a first data signal;
a second input node configured to receive a second data signal that is the complementary of the first data signal;
an adjustable delay stage having a first node coupled to the first input node and a second node coupled to the second input node, wherein the adjustable delay stage is configured to at least partially produce a delay in the first and/or second data signals to thereby generate a first delayed signal and/or second delayed signal;
a pulse generation stage having a first node coupled to a third node of the adjustable delay stage and a second node coupled to a fourth node of the adjustable delay stage and having a third node coupled to the first input node and a fourth node coupled to the second input node, wherein the pulse generation stage is configured to generate a first pulse signal from the first delayed signal and the first data signal and/or produce a second pulse signal from the second delayed signal and the second data signal;
a first output node coupled to a fifth node of the pulse generation stage configured to output the first pulse signal; and
a second output node coupled to a sixth node of the pulse generation stage configured to output the second pulse signal,
wherein the adjustable delay stage includes a first current source that is adjustable to increase the delay and a second current source that is adjustable to decrease the delay.

2. The circuit in accordance with claim 1, wherein the first pulse signal and/or the second pulse signal are summed with one or more signals from one or more additional stages of a post-amplifier to provide signal pre-emphasis for the post-amplifier.

3. The circuit in accordance with claim 1, wherein the first and second adjustable current sources receive instructions indicating the amount of delay to provide to the first and/or second data signals from one or more registers or receive a control signal from a control module specifying the amount of delay to provide to the first and/or second data signals.

4. The circuit in accordance with claim 1, wherein the adjustable delay stage comprises:
a first bipolar transistor having a base terminal coupled to the first input node, an emitter terminal coupled to the first adjustable current source, and a collector terminal coupled to a first terminal of a first resistor, wherein the first resistor has a second terminal configured to be coupled to a voltage supply when in operation;
a second bipolar transistor having a base terminal coupled to the second input node, an emitter terminal coupled to the second adjustable current source, and a collector terminal coupled to the first terminal of a second resistor, wherein the second resistor has a second terminal configured to be coupled to the voltage supply when in operation;
a third bipolar transistor having a base terminal coupled to the collector terminal of the first bipolar transistor and the first terminal of the first resistor, a collector terminal configured to be coupled to the voltage source when in operation, and an emitter terminal coupled to a third current source;
a fourth bipolar transistor having a base terminal coupled to the collector terminal of the second bipolar transistor and the first terminal of the second resistor, a collector terminal configured to be coupled to the voltage source when in operation, and an emitter terminal coupled to a fourth current source;
a fifth bipolar transistor having a base terminal coupled to the emitter terminal of the fourth bipolar transistor, a collector terminal coupled to the collector terminal of the first bipolar transistor and the first terminal of the first resistor, and an emitter terminal coupled to the second adjustable current source, wherein the base terminal is also coupled to the third node of the adjustable delay stage; and a sixth bipolar transistor having a base terminal coupled to the emitter terminal of the third bipolar transistor, a collector terminal coupled to the collector terminal of the second bipolar transistor and the first terminal of the second resistor, and an emitter terminal coupled to the second adjustable current source, wherein the base terminal is also coupled to the fourth node of the adjustable delay stage.

5. The circuit in accordance with claim 1, wherein the adjustable delay stage comprises:

a first FET transistor having a gate terminal coupled to the first input node, a source terminal coupled to the first adjustable current source, and a drain terminal coupled to a first terminal of a first resistor, wherein the first resistor has a second terminal configured to be coupled to a voltage supply when in operation;

a second FET transistor having a gate terminal coupled to the second input node, a source terminal coupled to the second adjustable current source, and a drain terminal coupled to the first terminal of a second resistor, wherein the second resistor has a second terminal configured to be coupled to the voltage supply when in operation;

a third FET transistor having a gate terminal coupled to the drain terminal of the first FET transistor and the first terminal of the first resistor, a drain terminal configured to be coupled to the voltage source when in operation, and a source terminal coupled to a third current source;

a fourth FET transistor having a gate terminal coupled to the drain terminal of the second FET transistor and the first terminal of the second resistor, a drain terminal configured to be coupled to the voltage source when in operation, and a source terminal coupled to a fourth current source;

a fifth FET transistor having a gate terminal coupled to the source terminal of the fourth FET transistor, a drain terminal coupled to the drain terminal of the first FET transistor and the first terminal of the first resistor, and a source terminal coupled to the second adjustable current source, wherein the gate terminal is also coupled to the third node of the adjustable delay stage; and a sixth FET transistor having a gate terminal coupled to the source terminal of the third FET transistor, a drain terminal coupled to the drain terminal of the second FET transistor and the first terminal of the second resistor, and a source terminal coupled to the second adjustable current source, wherein the gate terminal is also coupled to the fourth node of the adjustable delay stage.

6. The circuit in accordance with claim 1, wherein the pulse generation stage includes one or more adjustable current sources configurable to adjust the first and/or second pulse signals.

7. The circuit in accordance with claim 6, wherein the one or more adjustable current sources receive instructions indicating the amount of adjustment to provide to the first and/or second pulse signals from one or more registers or receive a control signal from a control module specifying the amount of adjustment to provide to the first and/or second pulse signals.

8. The circuit in accordance with claim 1, wherein the pulse generation stage comprises:

a first bipolar transistor having a base terminal coupled to the first node of the pulse generation stage, an emitter coupled to a first current source, and a collector terminal coupled to a first terminal of a first resistor, wherein the first resistor has a second terminal configured to be coupled to a voltage source when in operation;

a second bipolar transistor having a base terminal coupled to the second node of the pulse generation stage, an emitter coupled to the first current source, and a collector terminal coupled to a first terminal of a second resistor, wherein the second resistor has a second terminal configured to be coupled to the voltage source when in operation;

a third bipolar transistor having a base terminal coupled to the first input node, an emitter terminal coupled to a second current source, and a collector terminal coupled to the collector terminal of the first bipolar transistor and the first terminal of the first resistor;

a fourth bipolar transistor having a base terminal coupled to the second input node, an emitter terminal coupled to the second current source, and a collector terminal coupled to the collector terminal of the second bipolar transistor and the first terminal of the second resistor;

a fifth bipolar transistor having a base terminal coupled to the collector terminal of the second bipolar transistor and the first terminal of the second resistor; a collector terminal configured to be coupled to the voltage source when in operation, and an emitter terminal coupled to the first adjustable current source;

a sixth bipolar transistor having a base terminal coupled to the collector terminal of the first bipolar transistor and the first terminal of the first resistor; a collector terminal configured to be coupled to the voltage source when in operation, and an emitter terminal coupled to the second adjustable current source;

a seventh bipolar transistor having a base terminal coupled to the emitter terminal of the fifth bipolar transistor, an emitter terminal coupled to a third current source; and a collector terminal coupled to the first output node; and an eighth bipolar transistor having a base terminal coupled to the emitter terminal of the sixth bipolar transistor, an emitter terminal coupled to the third current source; and a collector terminal coupled to the second output node.

9. The circuit in accordance with claim 1, wherein the pulse generation stage comprises:

a first FET transistor having a gate terminal coupled to the first node of the pulse generation stage, a source coupled to a first current source, and a drain terminal coupled to a first terminal of a first resistor, wherein the first resistor has a second terminal configured to be coupled to a voltage source when in operation;

a second FET transistor having a gate terminal coupled to the second node of the pulse generation stage, a source coupled to the first current source, and a drain terminal coupled to a first terminal of a second resistor, wherein the second resistor has a second terminal configured to be coupled to the voltage source when in operation;

a third FET transistor having a gate terminal coupled to the first input node, a source terminal coupled to a second current source, and a drain terminal coupled to the drain terminal of the first FET transistor and the first terminal of the first resistor;

a fourth FET transistor having a gate terminal coupled to the second input node, a source terminal coupled to the second current source, and a drain terminal coupled to the drain terminal of the second FET transistor and the first terminal of the second resistor;

a fifth FET transistor having a gate terminal coupled to the drain terminal of the second FET transistor and the first terminal of the second resistor; a drain terminal configured to be coupled to the voltage source when in operation, and a source terminal coupled to the first adjustable current source;

a sixth FET transistor having a gate terminal coupled to the drain terminal of the first FET transistor and the first terminal of the first resistor; a drain terminal configured to be coupled to the voltage source when in operation, and a source terminal coupled to the second adjustable current source;

a seventh FET transistor having a gate terminal coupled to the source terminal of the fifth FET transistor, a source terminal coupled to a third current source; and a drain terminal coupled to the first output node; and an eighth FET transistor having a gate terminal coupled to the source terminal of the sixth FET transistor, a source terminal coupled to the third current source; and a drain terminal coupled to the second output node.

10. A post-amplifier comprising:

a first post-amplifier input node configured to receive a first data signal;

a second post-amplifier input node configured to receive a second data signal that is the complementary of the first data signal;

a first post-amplifier output node configured to provide the first data signal to a component exterior to the post-amplifier;

a second post-amplifier output node configured to provide the second data signal to a component exterior to the post-amplifier; and one or more post-amplifier stages configured between the post-amplifier input and output nodes; wherein at least one of the post-amplifier stages is a pre-emphasis stage comprising:

a first input node configured to receive the first data signal;

a second input node configured to receive the second data signal;

an adjustable delay stage having a first node coupled to the first input node and a second node coupled to the second input node, wherein the adjustable delay stage is configured to at least partially produce a delay in the first and/or second data signals to thereby generate a first delayed signal and/or second delayed signal;

a pulse generation stage having a first node coupled to a third node of the adjustable delay stage and a second node coupled to a fourth node of the adjustable delay stage and having a third node coupled to the first input node and a fourth node coupled to the second input node, wherein the pulse generation stage is configured to generate a first pulse signal from the first delayed signal and the first data signal and/or produce a second pulse signal from the second delayed signal and the second data signal;

a first output node coupled to a fifth node of the pulse generation stage configured to output the first pulse signal to the first post-amplifier output node; and a second output node coupled to a sixth node of the pulse generation stage configured to output the second pulse signal to the second post-amplifier output node, wherein the adjustable delay stage includes a first current source that is adjustable to increase the delay and a second current source that is adjustable to decrease the delay.

11. The post amplifier in accordance with claim 10, wherein the adjustable delay stage of the pre-emphasis stage comprises:

a first bipolar transistor having a base terminal coupled to the first input node, an emitter terminal coupled to the first adjustable current source, and a collector terminal coupled to a first terminal of a first resistor, wherein the first resistor has a second terminal configured to be coupled to a voltage supply when in operation;

a second bipolar transistor having a base terminal coupled to the second input node, an emitter terminal coupled to the second adjustable current source, and a collector terminal coupled to the first terminal of a second resistor, wherein the second resistor has a second terminal configured to be coupled to the voltage supply when in operation;

a third bipolar transistor having a base terminal coupled to the collector terminal of the first bipolar transistor and the first terminal of the first resistor, a collector terminal configured to be coupled to the voltage source when in operation, and an emitter terminal coupled to a third current source;

a fourth bipolar transistor having a base terminal coupled to the collector terminal of the second bipolar transistor and the first terminal of the second resistor, a collector terminal configured to be coupled to the voltage source when in operation, and an emitter terminal coupled to a fourth current source;

a fifth bipolar transistor having a base terminal coupled to the emitter terminal of the fourth bipolar transistor, a collector terminal coupled to the collector terminal of the first bipolar transistor and the first terminal of the first resistor, and an emitter terminal coupled to the second adjustable current source, wherein the base terminal is also coupled to the third node of the adjustable delay stage; and a sixth bipolar transistor having a base terminal coupled to the emitter terminal of the third bipolar transistor, a collector terminal coupled to the collector terminal of the second bipolar transistor and the first terminal of the second resistor, and an emitter terminal coupled to the second adjustable current source, wherein the base terminal is also coupled to the fourth node of the adjustable delay stage.

12. The post amplifier in accordance with claim 10, wherein the adjustable delay stage of the pre-emphasis stage comprises:

a first FET transistor having a gate terminal coupled to the first input node, a source terminal coupled to the first adjustable current source, and a drain terminal coupled to a first terminal of a first resistor, wherein the first resistor has a second terminal configured to be coupled to a voltage supply when in operation;

a second FET transistor having a gate terminal coupled to the second input node, a source terminal coupled to the second adjustable current source, and a drain terminal coupled to the first terminal of a second resistor, wherein the second resistor has a second terminal configured to be coupled to the voltage supply when in operation;

a third FET transistor having a gate terminal coupled to the drain terminal of the first FET transistor and the first terminal of the first resistor, a drain terminal configured to be coupled to the voltage source when in operation, and a source terminal coupled to a third current source;

a fourth FET transistor having a gate terminal coupled to the drain terminal of the second FET transistor and the first terminal of the second resistor, a drain terminal configured to be coupled to the voltage source when in operation, and a source terminal coupled to a fourth current source;

a fifth FET transistor having a gate terminal coupled to the source terminal of the fourth FET transistor, a drain terminal coupled to the drain terminal of the first FET transistor and the first terminal of the first resistor, and a source terminal coupled to the second adjustable current source, wherein the gate terminal is also coupled to the third node of the adjustable delay stage; and a sixth FET transistor having a gate terminal coupled to the source terminal of the third FET transistor, a drain terminal coupled to the drain terminal of the second FET transistor and the first terminal of the second resistor, and a source terminal coupled to the second adjustable current source, wherein the gate terminal is also coupled to the fourth node of the adjustable delay stage.

13. The post amplifier in accordance with claim 10, wherein the pulse generation stage of the pre-emphasis stage comprises:

a first bipolar transistor having a base terminal coupled to the first node of the pulse generation stage, an emitter coupled to a first current source, and a collector terminal coupled to a first terminal of a first resistor, wherein the first resistor has a second terminal configured to be coupled to a voltage source when in operation;

a second bipolar transistor having a base terminal coupled to the second node of the pulse generation stage, an emitter coupled to the first current source, and a collector terminal coupled to a first terminal of a second resistor, wherein the second resistor has a second terminal configured to be coupled to the voltage source when in operation;

a third bipolar transistor having a base terminal coupled to the first input node, an emitter terminal coupled to a second current source, and a collector terminal coupled to the collector terminal of the first bipolar transistor and the first terminal of the first resistor;

a fourth bipolar transistor having a base terminal coupled to the second input node, an emitter terminal coupled to the second current source, and a collector terminal coupled to the collector terminal of the second bipolar transistor and the first terminal of the second resistor;

a fifth bipolar transistor having a base terminal coupled to the collector terminal of the second bipolar transistor and the first terminal of the second resistor; a collector terminal configured to be coupled to the voltage source when in operation, and an emitter terminal coupled to the first adjustable current source;

a sixth bipolar transistor having a base terminal coupled to the collector terminal of the first bipolar transistor and the first terminal of the first resistor; a collector terminal configured to be coupled to the voltage source when in operation, and an emitter terminal coupled to the second adjustable current source;

a seventh bipolar transistor having a base terminal coupled to the emitter terminal of the fifth bipolar transistor, an emitter terminal coupled to a third current source; and a collector terminal coupled to the first output node; and an eighth bipolar transistor having a base terminal coupled to the emitter terminal of the sixth bipolar transistor, an emitter terminal coupled to the third current source; and a collector terminal coupled to the second output node.

14. The post amplifier in accordance with claim 10, wherein the pulse generation stage of the pre-emphasis stage comprises:

a first FET transistor having a gate terminal coupled to the first node of the pulse generation stage, a source coupled to a first current source, and a drain terminal coupled to a first terminal of a first resistor, wherein the first resistor has a second terminal configured to be coupled to a voltage source when in operation;

a second FET transistor having a gate terminal coupled to the second node of the pulse generation stage, a source coupled to the first current source, and a drain terminal coupled to a first terminal of a second resistor, wherein the second resistor has a second terminal configured to be coupled to the voltage source when in operation;

a third FET transistor having a gate terminal coupled to the first input node, a source terminal coupled to a second current source, and a drain terminal coupled to the drain terminal of the first FET transistor and the first terminal of the first resistor;

a fourth FET transistor having a gate terminal coupled to the second input node, a source terminal coupled to the second current source, and a drain terminal coupled to the drain terminal of the second FET transistor and the first terminal of the second resistor;

a fifth FET transistor having a gate terminal coupled to the drain terminal of the second FET transistor and the first terminal of the second resistor; a drain terminal configured to be coupled to the voltage source when in operation, and a source terminal coupled to the first adjustable current source;

a sixth FET transistor having a gate terminal coupled to the drain terminal of the first FET transistor and the first terminal of the first resistor; a drain terminal configured to be coupled to the voltage source when in operation, and a source terminal coupled to the second adjustable current source;

a seventh FET transistor having a gate terminal coupled to the source terminal of the fifth FET transistor, a source terminal coupled to a third current source; and a drain terminal coupled to the first output node; and an eighth FET transistor having a gate terminal coupled to the source terminal of the sixth FET transistor, a source terminal coupled to the third current source; and a drain terminal coupled to the second output node.

15. An optical transceiver comprising:

a laser driver;

a TOSA coupled to the laser driver;

a post-amplifier;

a ROSA coupled to the post-amplifier;

wherein the post-amplifier includes a pre-emphasis stage comprising:

a first input node configured to receive the first data signal;

a second input node configured to receive the second data signal;

an adjustable delay stage having a first node coupled to the first input node and a second node coupled to the second input node, wherein the adjustable delay stage is configured to at least partially produce a delay in the first and/or second data signals to thereby generate a first delayed signal and/or second delayed signal;

a pulse generation stage having a first node coupled to a third node of the adjustable delay stage and a second node coupled to a fourth node of the adjustable delay stage and having a third node coupled to the first input node and a fourth node coupled to the second input node, wherein the pulse generation stage is configured to generate a first pulse signal from the first delayed signal and the first data signal and/or produce a second pulse signal from the second delayed signal and the second data signal;

a first output node coupled to a fifth node of the pulse generation stage configured to output the first pulse signal to the first post-amplifier output node; and a second output node coupled to a sixth node of the pulse generation stage configured to output the second pulse signal to the second post-amplifier output node, wherein the adjustable delay stage includes a first current source that is adjustable to increase the delay and a second current source that is adjustable to decrease the delay.

16. The optical transceiver in accordance with claim 15, wherein the adjustable delay stage of the pre-emphasis stage comprises:

a first bipolar transistor having a base terminal coupled to the first input node, an emitter terminal coupled to the first adjustable current source, and a collector terminal coupled to a first terminal of a first resistor, wherein the first resistor has a second terminal configured to be coupled to a voltage supply when in operation;

a second bipolar transistor having a base terminal coupled to the second input node, an emitter terminal coupled to the second adjustable current source, and a collector terminal coupled to the first terminal of a second resistor, wherein the second resistor has a second terminal configured to be coupled to the voltage supply when in operation;

a third bipolar transistor having a base terminal coupled to the collector terminal of the first bipolar transistor and the first terminal of the first resistor, a collector terminal configured to be coupled to the voltage source when in operation, and an emitter terminal coupled to a third current source;

a fourth bipolar transistor having a base terminal coupled to the collector terminal of the second bipolar transistor and the first terminal of the second resistor, a collector terminal configured to be coupled to the voltage source when in operation, and an emitter terminal coupled to a fourth current source;

a fifth bipolar transistor having a base terminal coupled to the emitter terminal of the fourth bipolar transistor, a collector terminal coupled to the collector terminal of the first bipolar transistor and the first terminal of the first resistor, and an emitter terminal coupled to the second adjustable current source, wherein the base terminal is also coupled to the third node of the adjustable delay stage; and a sixth bipolar transistor having a base terminal coupled to the emitter terminal of the third bipolar transistor, a collector terminal coupled to the collector terminal of the second bipolar transistor and the first terminal of the second resistor, and an emitter terminal coupled to the second adjustable current source, wherein the base terminal is also coupled to the fourth node of the adjustable delay stage.

17. The optical transceiver in accordance with claim 15, wherein the adjustable delay stage of the pre-emphasis stage comprises:

a first FET transistor having a gate terminal coupled to the first input node, a source terminal coupled to the first adjustable current source, and a drain terminal coupled to a first terminal of a first resistor, wherein the first resistor has a second terminal configured to be coupled to a voltage supply when in operation;

a second FET transistor having a gate terminal coupled to the second input node, a source terminal coupled to the second adjustable current source, and a drain terminal coupled to the first terminal of a second resistor, wherein the second resistor has a second terminal configured to be coupled to the voltage supply when in operation;

a third FET transistor having a gate terminal coupled to the drain terminal of the first FET transistor and the first terminal of the first resistor, a drain terminal configured to be coupled to the voltage source when in operation, and a source terminal coupled to a third current source;

a fourth FET transistor having a gate terminal coupled to the drain terminal of the second FET transistor and the first terminal of the second resistor, a drain terminal configured to be coupled to the voltage source when in operation, and a source terminal coupled to a fourth current source;

a fifth FET transistor having a gate terminal coupled to the source terminal of the fourth FET transistor, a drain terminal coupled to the drain terminal of the first FET transistor and the first terminal of the first resistor, and a source terminal coupled to the second adjustable current source, wherein the gate terminal is also coupled to the third node of the adjustable delay stage; and a sixth FET transistor having a gate terminal coupled to the source terminal of the third FET transistor, a drain terminal coupled to the drain terminal of the second FET transistor and the first terminal of the second resistor, and a source terminal coupled to the second adjustable current source, wherein the gate terminal is also coupled to the fourth node of the adjustable delay stage.

18. The optical transceiver in accordance with claim 15, wherein the pulse generation stage of the pre-emphasis stage comprises:

a first bipolar transistor having a base terminal coupled to the first node of the pulse generation stage, an emitter coupled to a first current source, and a collector terminal coupled to a first terminal of a first resistor, wherein the first resistor has a second terminal configured to be coupled to a voltage source when in operation;

a second bipolar transistor having a base terminal coupled to the second node of the pulse generation stage, an emitter coupled to the first current source, and a collector terminal coupled to a first terminal of a second resistor, wherein the second resistor has a second terminal configured to be coupled to the voltage source when in operation;

a third bipolar transistor having a base terminal coupled to the first input node, an emitter terminal coupled to a second current source, and a collector terminal coupled to the collector terminal of the first bipolar transistor and the first terminal of the first resistor;

a fourth bipolar transistor having a base terminal coupled to the second input node, an emitter terminal coupled to the second current source, and a collector terminal coupled to the collector terminal of the second bipolar transistor and the first terminal of the second resistor;

a fifth bipolar transistor having a base terminal coupled to the collector terminal of the second bipolar transistor and the first terminal of the second resistor; a collector terminal configured to be coupled to the voltage source when in operation, and an emitter terminal coupled to the first adjustable current source;

a sixth bipolar transistor having a base terminal coupled to the collector terminal of the first bipolar transistor and the first terminal of the first resistor; a collector terminal configured to be coupled to the voltage source when in operation, and an emitter terminal coupled to the second adjustable current source;

a seventh bipolar transistor having a base terminal coupled to the emitter terminal of the fifth bipolar transistor, an emitter terminal coupled to a third current source; and a collector terminal coupled to the first output node; and an eighth bipolar transistor having a base terminal coupled to the emitter terminal of the sixth bipolar transistor, an emitter terminal coupled to the third current source; and a collector terminal coupled to the second output node.

19. The optical transceiver in accordance with claim 15, wherein the pulse generation stage of the pre-emphasis stage comprises:

a first FET transistor having a gate terminal coupled to the first node of the pulse generation stage, a source coupled to a first current source, and a drain terminal coupled to a first terminal of a first resistor, wherein the first resistor has a second terminal configured to be coupled to a voltage source when in operation;

a second FET transistor having a gate terminal coupled to the second node of the pulse generation stage, a source coupled to the first current source, and a drain terminal coupled to a first terminal of a second resistor, wherein the second resistor has a second terminal configured to be coupled to the voltage source when in operation;

a third FET transistor having a gate terminal coupled to the first input node, a source terminal coupled to a second current source, and a drain terminal coupled to the drain terminal of the first FET transistor and the first terminal of the first resistor;

a fourth FET transistor having a gate terminal coupled to the second input node, a source terminal coupled to the second current source, and a drain terminal coupled to the drain terminal of the second FET transistor and the first terminal of the second resistor;

a fifth FET transistor having a gate terminal coupled to the drain terminal of the second FET transistor and the first terminal of the second resistor; a drain terminal configured to be coupled to the voltage source when in operation, and a source terminal coupled to the first adjustable current source;

a sixth FET transistor having a gate terminal coupled to the drain terminal of the first FET transistor and the first terminal of the first resistor; a drain terminal configured to be coupled to the voltage source when in operation, and a source terminal coupled to the second adjustable current source;

a seventh FET transistor having a gate terminal coupled to the source terminal of the fifth FET transistor, a source terminal coupled to a third current source; and a drain terminal coupled to the first output node; and an eighth FET transistor having a gate terminal coupled to the source terminal of the sixth FET transistor, a source terminal coupled to the third current source; and a drain terminal coupled to the second output node.

* * * * *